United States Patent
Thankappan et al.

(10) Patent No.: US 9,818,086 B2
(45) Date of Patent: Nov. 14, 2017

(54) METHODS AND SYSTEMS FOR PROVIDING PREDICTIVE METRICS IN A TALENT MANAGEMENT APPLICATION

(71) Applicant: Oracle International Corporation, Redwood Shores, CA (US)

(72) Inventors: Sharad Thankappan, Mountain View, CA (US); Samar Lotia, Cupertino, CA (US); Saurabh Pandey, Santa Clara, CA (US); Irvin Shuster, Bloomfield, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 972 days.

(21) Appl. No.: 14/023,310

(22) Filed: Sep. 10, 2013

(65) Prior Publication Data
US 2014/0074738 A1   Mar. 13, 2014

Related U.S. Application Data

(60) Provisional application No. 61/699,600, filed on Sep. 11, 2012, provisional application No. 61/699,593, filed on Sep. 11, 2012.

(51) Int. Cl.
*G06Q 10/00* (2012.01)
*G06Q 10/10* (2012.01)

(52) U.S. Cl.
CPC ......... *G06Q 10/1053* (2013.01); *G06Q 10/10* (2013.01)

(58) Field of Classification Search
USPC .................................................. 705/320, 321
See application file for complete search history.

(56) References Cited

U.S. PATENT DOCUMENTS

| | | | |
|---|---|---|---|
| 6,728,695 B1* | 4/2004 | Pathria | G06F 17/2715 |
| 2002/0042786 A1* | 4/2002 | Scarborough | G06Q 10/063 706/21 |
| 2006/0265267 A1 | 11/2006 | Chen et al. | |
| 2008/0300952 A1 | 12/2008 | Couper | |
| 2012/0271775 A1 | 10/2012 | Bell et al. | |
| 2012/0330856 A1* | 12/2012 | Hyder | G06Q 10/00 705/321 |
| 2013/0262469 A1* | 10/2013 | Whitman | G06F 17/30029 707/741 |
| 2014/0074739 A1 | 3/2014 | Rammohan | |

OTHER PUBLICATIONS

Non-Final Office Action dated Aug. 2, 2016, for U.S. Appl. No. 14/023,379, 7 pages.
U.S. Appl. No. 14/023,379, Final Office Action dated Mar. 2, 2017, 10 pages.

* cited by examiner

*Primary Examiner* — Gabrielle McCormick
(74) *Attorney, Agent, or Firm* — Kilpatrick Townsend and Stockton LLP

(57) ABSTRACT

Techniques for providing predictive metrics relating to employment positions are provided. A method may include receiving, by a computing device, data relating to a plurality of employment positions, wherein the data is received from a plurality of customers. The computing device may aggregate the data received from the plurality of customers and may determine statistics using the aggregated data, which are based on each of the plurality of employment positions. The computing device may generate one or more predictive metrics relating to the plurality of employment positions using one or more of the statistics.

20 Claims, 20 Drawing Sheets

METHODS AND SYSTEMS FOR PROVIDING PREDICTIVE METRICS IN A TALENT MANAGEMENT APPLICATION

CROSS REFERENCES TO RELATED APPLICATIONS

The present application is a non-provisional of and claims the benefit and priority under 35 U.S.C. §119(e) of U.S. Provisional Application No. 61/699,600 filed Sep. 11, 2012 entitled "METHODS AND SYSTEMS FOR PROVIDING A TALENT INDEX IN AN INTERFACE FOR A TALENT MANAGEMENT APPLICATION," and U.S. Provisional Application No. 61/699,593 filed Sep. 11, 2012 entitled "METHODS AND SYSTEMS FOR A JOB SUGGESTION ENGINE AND TALENT TIMELINE IN A TALENT MANAGEMENT APPLICATION," the entire contents of each which is hereby incorporated by reference for all purposes. This application is also related to application Ser. No. 14/023,379, filed Sep. 10, 2013, entitled "METHODS AND SYSTEMS FOR A JOB SUGGESTION ENGINE AND TALENT TIMELINE IN A TALENT MANAGEMENT APPLICATION," the entire contents of which is hereby incorporated by reference as if fully set forth herein, under 35 U.S.C. §120.

BACKGROUND

Job search and posting techniques for providing information to job candidates and employers are limited to either the supply side of the market or the demand side of the market. Additionally, these prior techniques do not and cannot track recruiting engagements as end-to-end transactions. Therefore, any conclusions drawn from data in these approaches is severely limited. For example, one prior approach involves using a jobs board to post jobs. Such a board can have and can access significant amounts of data about the demand side of the market, including open positions. Some approaches try to aggregate this data by scraping jobs boards and building a representation of the job market based on postings. However, such boards do not have visibility into the available candidates or the filled positions. Accordingly, approaches using jobs board information do not know when the position is filled or who filled it. As another example, various professional social networks may be used to collect data. These networks can have and can access tremendous amounts of information about the supply side of the market, such as available candidates. However, there is no visibility into and use of the entire hiring process, including application, interview, offer, and acceptance, such that it can be considered a completed transaction.

BRIEF SUMMARY

Techniques for providing predictive metrics relating to employment positions are provided. In some embodiments, a computer-implemented method may be provided that includes receiving, by a computing device, data relating to a plurality of employment positions, wherein the data is received from a plurality of customers. The method may further include aggregating, by the computing device, the data received from the plurality of customers and determining, by the computing device, statistics using the aggregated data, wherein the statistics are based on each of the plurality of employment positions. The method may further include generating, by the computing device, one or more predictive metrics relating to the plurality of employment positions using one or more of the statistics.

In some embodiments, a talent recruiting system may be provided that includes a memory storing a plurality of instructions and one or more processors configured to access the memory. The one or more processors may be further configured to execute the plurality of instructions to: receive data relating to a plurality of employment positions, wherein the data is received from a plurality of customers; aggregate the data received from the plurality of customers; determine statistics using the aggregated data, wherein the statistics are based on each of the plurality of employment positions; and generate one or more predictive metrics relating to the plurality of employment positions using one or more of the statistics.

In some embodiments, a computer-readable memory storing a plurality of instructions executable by one or more processors may be provided, wherein the plurality of instructions may include instructions that cause the one or more processors to receive data relating to a plurality of employment positions, wherein the data is received from a plurality of customers. The instructions may further include instructions that cause the one or more processors to aggregate the data received from the plurality of customers and instructions that cause the one or more processors to determine statistics using the aggregated data, wherein the statistics are based on each of the plurality of employment positions. The instructions may further include instructions that cause the one or more processors to generate one or more predictive metrics relating to the plurality of employment positions using one or more of the statistics.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
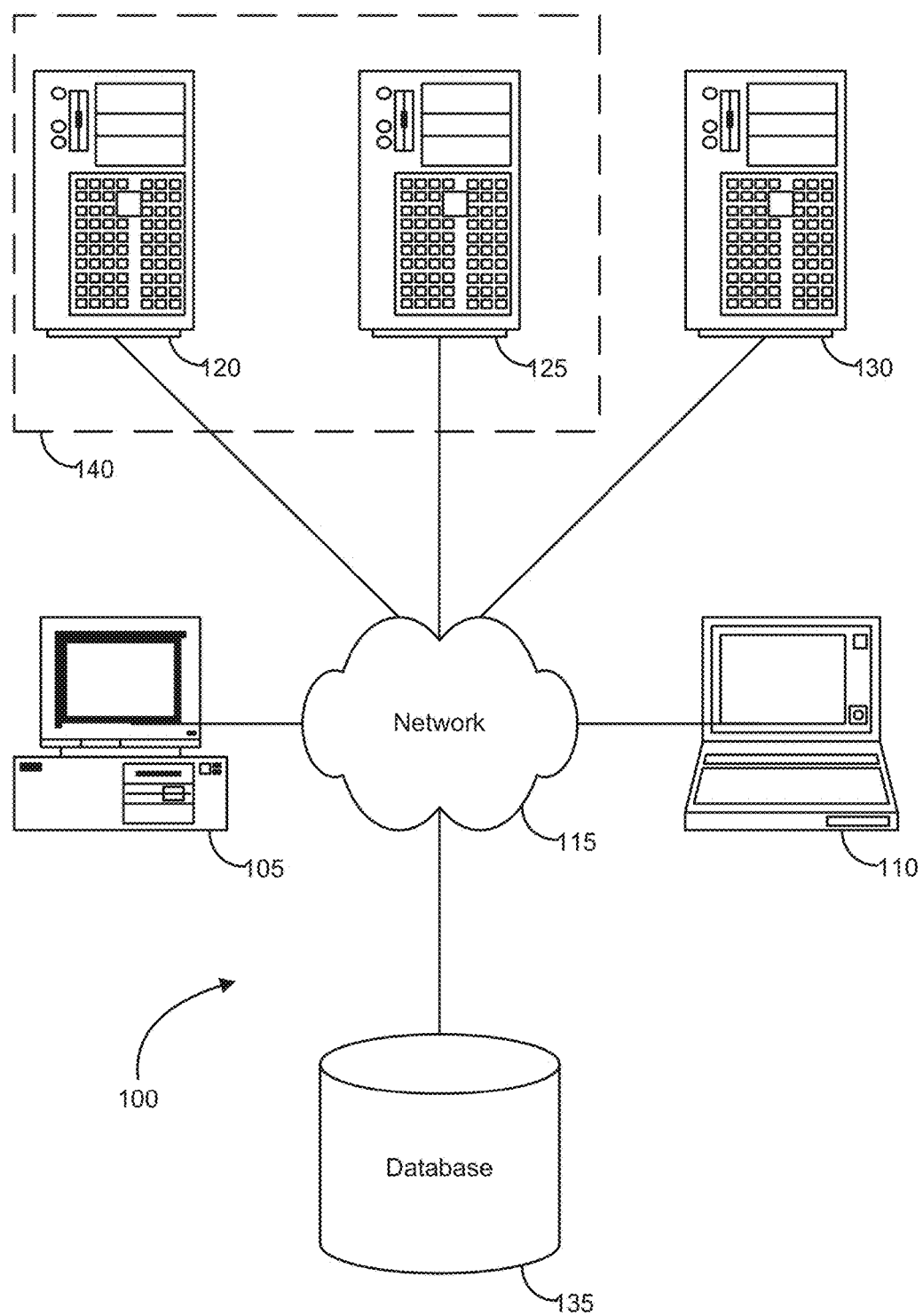
FIG. 1 is a block diagram illustrating components of an exemplary operating environment in which various embodiments of the present application may be implemented.

In the following description, for the purposes of explanation, numerous specific details are set forth in order to provide a thorough understanding of various embodiments of the present application. It will be apparent, however, to one skilled in the art that embodiments of the present application may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present application are directed to a talent recruiting application which can be used by recruiters and/or managers of a business to recruit and hire candidates for open positions or by the candidates to locate and apply for open positions. Such applications can be implemented in many different ways but in some cases are offered as a cloud-based Software as a Service (SaaS) offering in which the application, running on one or any number of computers, can be made available to customers, typically corporations or other businesses, for use in recruiting talent for open positions.

When offered as SaaS, as a hosted solution, or any other software based service, the talent recruiting application can generate, maintain, and use very large amounts of data related to past and present open positions as well as past and present candidates. For example, the talent recruiting application may receive data relating to a plurality of positions from a group of customers, which may include various companies or businesses that subscribe to the talent recruiting application. The data received from the group of customers may include details of the various positions, such as the location of the position, the description of the candidate requirements, salary expectations, where the position will be posted, and the like. The data may be analyzed to provide insights into detailed statistics of the positions based on information included in the data, such as when and where the position is posted, when one or more applications are submitted by candidates, whether and when any interviews of candidates have been conducted, whether and when offers of employment have been submitted to candidates, whether and when an acceptance of any offers have been received from candidates, the skill, education, experience, and demographic profile of candidates, and/or details regarding on-boarding of candidates as new employees of the companies. Embodiments of the present application are directed to an application that not only maintains such data but that also tracks a posting for an open position and recruiting engagements as a transaction. These transaction can be tracked from beginning to end, i.e., from a posting of an open position, to an application by a candidate, to an interview of the candidate, to an offer of employment in the position to that candidate, to an acceptance of the offer by the candidate, and even to on-boarding of the candidate as a new employee of the company. Such extensive, end-to-end data, especially when viewed across multiple different customers or businesses, can be used to provide visibility into dynamics of the talent market that would otherwise not be available.

Prior approaches to providing such information were limited to either the supply side of the market, such as the candidates, or the demand side of the market, such as the companies or businesses that have open positions. Additionally, these prior approaches did not and could not track recruiting engagements as end-to-end transactions. Therefore, any conclusions drawn from data in these approaches were severely limited. For example, one prior approach involves a jobs board. Such a board can have and can access significant amounts of data about the demand side of the market (i.e., the open positions). Some approaches try to aggregate this data by scraping jobs boards and building a representation of the job market based on postings. But, such boards do not have visibility into the available candidates or the filled positions. That is, approaches using jobs board information do not know when the position is filled or who filled it. In another approach, various professional social networks can be used to collect data. These networks can have and can access tremendous amounts of information about the supply side of the market (e.g., candidates). But still, there is no visibility into or use of information relating to the entire process, including submission of an application, interview(s), offer, and acceptance, such that it can be considered a completed transaction.

In embodiments of the present application, the talent recruiting application can provide visibility into both supply and demand components of the market to the point where the actual transaction gets consummated, i.e., a candidate gets hired. This is different from a jobs board or social network approaches in that they may know only a piece of the transaction. For example, a job board or social network approach may only know that a job is available or that someone is looking for a position. However, neither of these platforms are aware that there has actually been an application, interview, offer, and/or acceptance. The talent recruiting application of the present application can also have access to other information, such as information about the source for a candidate (e.g., where/how did the candidate learn about this job). Such information might come from a candidate or from a business seeking to fill an open position. In either case, such information provides additional visibility into that transaction.

Using that visibility, embodiments of the present application are able to answer specific questions, such as: If I am looking for a particular set of skills for a given position to be filled from outside of the organization, where is the best market for filling this position? It should be noted that two dimensions of the market are being considered here, the skills needed and the relevant geography. For example, San Jose has a high concentration of Java developers but also high demand for those skills. So the result is actually that San Jose is a difficult market in which to hire because, while the supply is high, so is the demand, which results in significant competition for both talent and open positions. Embodiments of the present application are also able to answer other questions, such as: For a particular market, how hard is it to hire, how much should I expect to pay, and how long will it take to fill an open position? According to one embodiment, each of these questions may be answered by receiving and aggregating data relating to employment positions, determining statistics using the aggregated data, and generating various predictive metrics that relate to each question using the statistics. In some embodiments, answers to the various questions can be quantified as a single measure or index that gives the marketplace an indication of relative difficulty for particular positions. This single measure or index may be referred to herein as a "talent index," and can be a representation of the market based on quantitative and statistical analysis of previous transactions. The talent index can thus give a relative measure of the market between geographic areas.

In some embodiments, the talent recruiting application can also provide a wide variety of information to the candidate. That is, using these tools, recruiters can include additional information about the company, such as what the company does, why it might be a good fit for a candidate, cultural aspects, work environment, neighborhood, transportation, schools, etc. collected from third-party sources or provided by recruiter or manager or from any of a variety of other sources. Together, such information can provide a work culture context for candidates to learn more about the organization. In some cases, additional dimensions that might be important to the candidates can be defined by the candidate, the recruiter, by others recommending the position, current employees, etc. Together, this information creates the right kind of content for a particular open position and for a particular candidate. In other words, information is provided to more fully engage the candidate and market the company and the position to the candidate.

According to one embodiment, candidate information can be abstracted and a determination can be made as to the intersection of those candidates with positions. For example, this determination can be made based on information including but not limited to education, skills, experience, etc. of candidates compared to the qualifications required for the positions for which those candidates apply. Such information can comprise attributes, tags, and/or other information associated with the candidate and/or the open position and may be defined in any of a variety of ways. For example, information for an open position may be defined by a recruiter or manager when posting an open position or collected from other public or private sources. Information for the candidate may be defined by the candidate or collected from other sources such as social networks etc. In some cases, this information can also be anonymized to protect the privacy of the candidates.

A determination can be made as to a geographic region over which a market will be defined. In some embodiments, a market may be defined on a state-by-state bases, with each state including a market. In other embodiments, using an entire state may be too large of a data set to provide relevant and useful data, such as in large, diverse, and/or highly populated states. In states that are large, diverse, and/or highly populated, a market might be broken up by county, city, or other regions of each state. According to one embodiment, other aggregations of data between zip code and state, like a Metropolitan Statistical Area (MSA), can be used. Regardless of exactly how the area is defined, the area should provide a defined geography that is granular enough to provide meaningful data to an end user such as a candidate or a recruiter but large enough to provide data that is robust and statistically reliable and stable. Typically, a recruiter or other party posting an open position can and will identify a geography of or for that position. For example, the recruiter may provide a zip code. This information can be mapped or associated for a particular open position to a particular MSA.

Other statistics related to an open position and used by various embodiments can include, but are not limited to, a time when a position is posted, how long is required to fill that position, how many candidates applied to the position, and/or the salary at the time the position is filled. These dynamics can be applied to the intersection of job and geography. The degree of confidence in these statistics can provide metrics for a particular sample (e.g., a particular job in a particular market), and the difference between the degree of confidence for the sample and the mean for the market may also be used to provide metrics for the sample.

An exemplary application of this approach can comprise a data service that can be consumed in multiple other applications. For example, a company or a recruiter can use the application to determine a geographic area for a particular open position or to determine a best source of candidates (e.g., job boards, social media, organizations, and the like). In another exemplary application, a hiring manager can review the accumulated, aggregated, and abstracted data when asked to grow a team and can use that information to consider where to locate a team, how long it will take to complete the team, budget for a particular level of growth, when revenue from that growth will be realized, and the like. In yet another exemplary application, a recruiter or manager (e.g., a recruiting executive, hiring manager, or the like) may compare the efficiency of a recruiting or hiring process with industry efficiency rates of recruiting or hiring processes. The comparison may highlight opportunities for recruiting or hiring process optimizations that, for example, may yield higher quality hires in a shorter period of time. Other applications and uses, as well as variations in the exact implementation of various embodiments of the present application are contemplated and considered within the scope of the present application.

Various specific embodiments relating to the talent recruiting application will now be described below with respect to FIGS. 1-20.

FIG. 1 is a block diagram illustrating components of an exemplary operating environment in which various embodiments of the present application may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
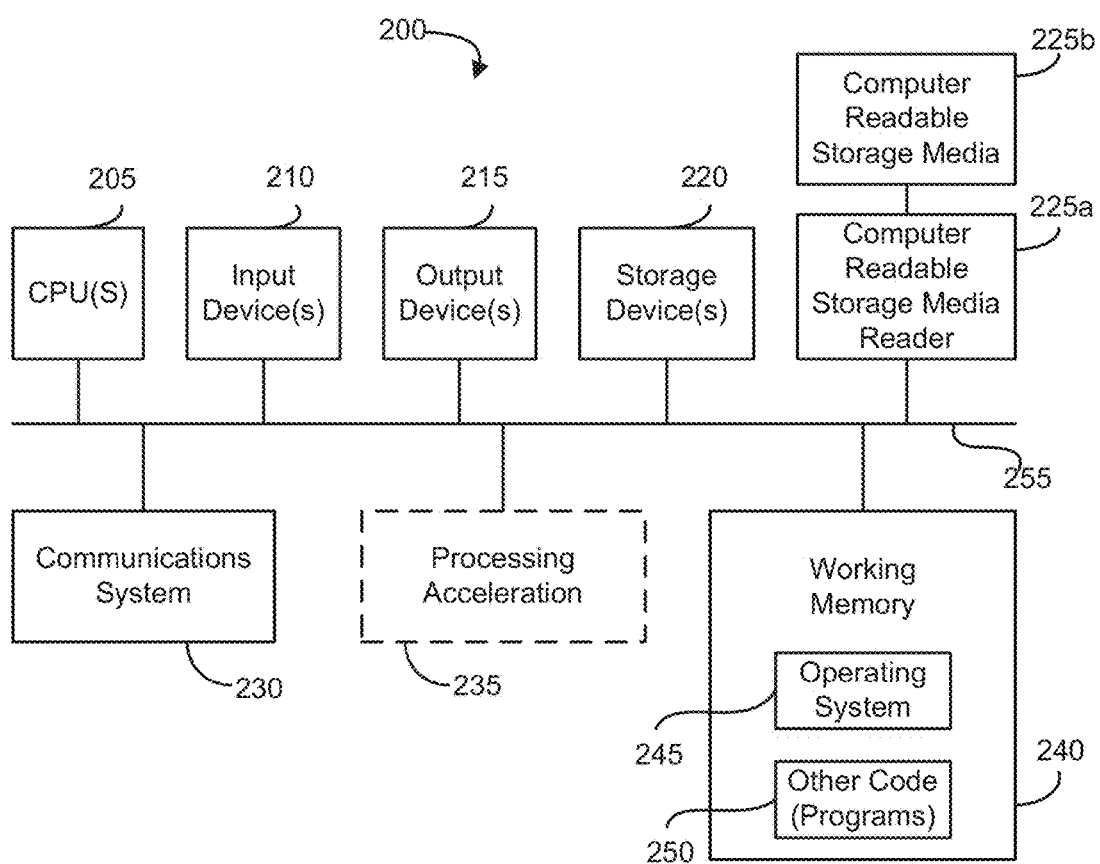
FIG. 2 is a block diagram illustrating an exemplary computer system in which embodiments of the present application may be implemented.

FIG. 2 illustrates an exemplary computer system 200, in which various embodiments of the present application may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.).

In some embodiments, the working memory 240 stores a plurality of instructions. The central processing units (CPUs) 205 may be configured to access the working memory 240 and to execute the plurality of instructions to receive data relating to a plurality of employment positions, wherein the data is received from a plurality of customers, aggregate the data received from the plurality of customers, determine statistics using the aggregated data, wherein the statistics are based on each of the plurality of employment positions, and generate one or more predictive metrics relating to the plurality of employment positions using one or more of the statistics.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present application as described herein.

Figure 3:
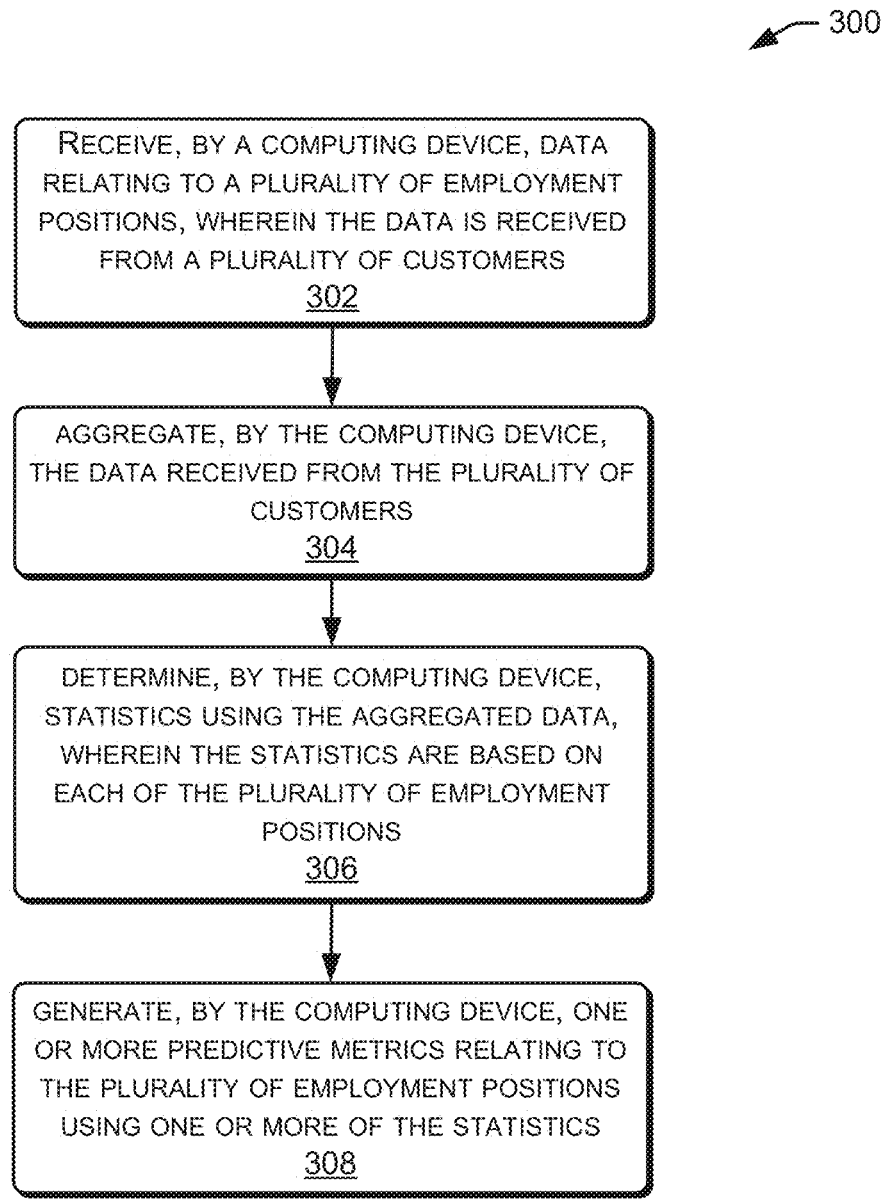
FIG. 3 illustrates a flowchart of an embodiment of a process for generating one or more predictive metrics according to one embodiment of the present application.
Figure 4:
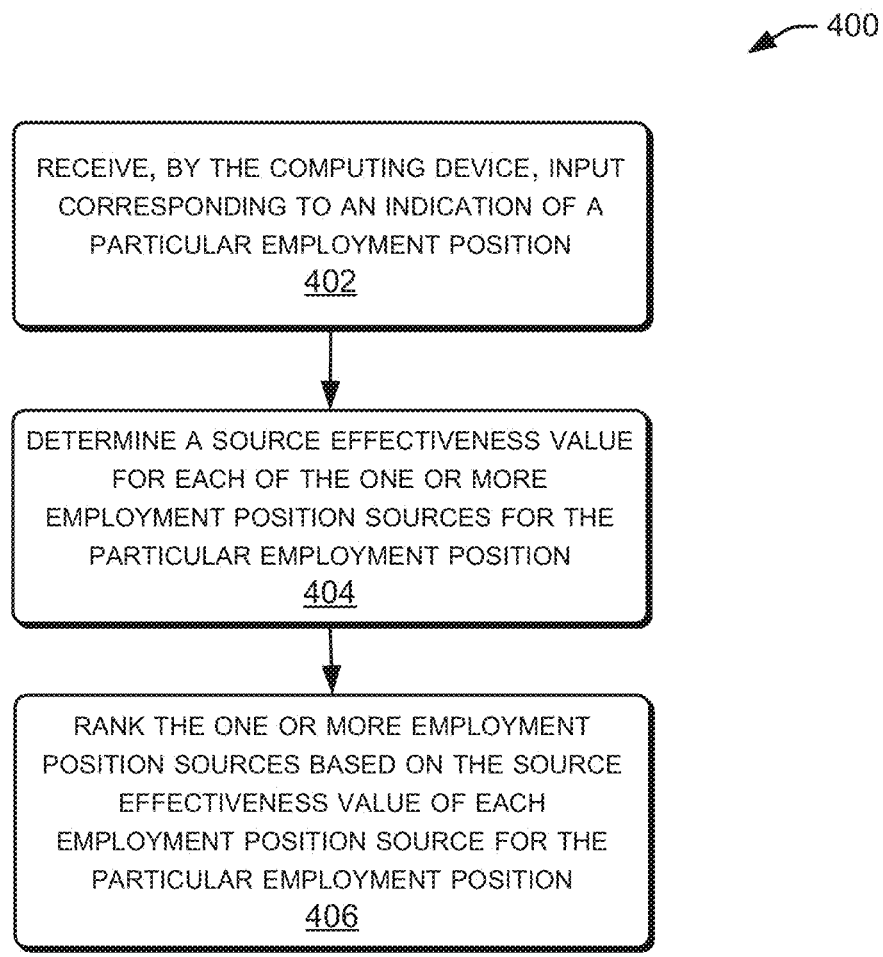
FIG. 4 illustrates a flowchart of an embodiment of a process for ranking employment position sources or source types according to one embodiment of the present application.

FIG. 3 illustrates an exemplary process 300 for generating one or more predictive metrics. FIG. 4 illustrates an exemplary process 400 for ranking employment position sources or source types. Processes 300 and 400 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes 300 and/or 400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be nontransitory.

In some aspects, the processes 300 and/or 400 may be performed by a computing device, such as the one or more server computers 120, 125, 130 shown in FIG. 1 or the computer system 200 shown in FIG. 2.

Process 300 may begin at 302 by receiving data relating to a plurality of employment positions, wherein the data is received from a plurality of customers. The customers may be subscribed to a talent recruiting application, and may provide the data via the application. The data relating to the employment positions may include details of the various positions, such as the location of the position, description of the candidate requirements, salary expectations, where the position will be posted, and the like.

At 304, the process 300 may aggregate the data received from the plurality of customers. In some embodiments, the aggregated data may be stored in a database (e.g., a customer database). The aggregated data may be abstracted or normalized. For example, since different organizations may define their needs differently, job information for open employment positions (e.g., job title, job source, and the like) may need to be abstracted or normalized so that analysis can be done on a consistent basis for similar positions. For example, one company, recruiter, or other user may specifically post an employment position or requisition for a "Java developer," while another company, recruiter, or other user may post an employment position for a "developer" without further specificity as to what type of developer. Based on the nature of the company, the nature of a service of the company, the history of the company, function of the position, other criteria for the position (e.g., listed in the employment position posting), and the like, the Java developer position and the developer position may be determined to be the same type of position. As a result, the two positions may be considered to be identical when analyzing the data for statistics. Determinations as to whether different position titles are similar may be made using available tools that search a data set, analyze the attributes of the data in that set, and cluster the data set based on the attributes. The attributes of a position may include expectations, skills, questions asked, accomplishments, requirements, and the like. The attributes thus may be used to identify which clusters (e.g., jobs or job categories) the data in the data set belongs. Additionally or alternatively, other algorithms may be used to determine how customer businesses have mapped jobs. For example, embodiments of the present application may use the Bureau of Labor Statistics job classification matrix to map job categories or classifications to posted openings. But, not all customer businesses map the same way. For example, some might map software developer to the "architect and design" category even though that may refer to a building architect in the Bureau of Labor Statistics job classification matrix. Therefore, more than one approach may be used when abstracting job information.

At 306, the process 300 may determine statistics using the aggregated data, wherein the statistics are based on each of the plurality of employment positions. For example, the statistics may include a time at which each of the plurality of employment positions is posted, a time period indicating how long was required to fill each of the plurality of employment positions, a number of candidates that applied to each of the plurality of employment positions, the salary of each of the plurality of employment positions, and/or the source that was successful in locating a candidate that filled the position. The statistics may be based on information included in the aggregated data, such as when and where (what sources) the positions are posted, when one or more applications are submitted by candidates for the positions, whether and when any interviews of candidates have been conducted for the positions, whether and when offers of employment have been submitted to candidates, whether and when an acceptance of any offers have been received from candidates, and/or details regarding on-boarding of candidates as new employees of the companies. Accordingly, statistics for all postings of a particular position (e.g., a JAVA developer) may be determined and used to provide further information to users of the talent recruiting application.

At 308, the process 300 may generate one or more predictive metrics relating to the plurality of employment positions using one or more of the statistics. For example, each predictive metric may relate to a certain characteristic of a generic employment position. As an example, a user may select or otherwise input a particular position (e.g., Java Developer), and the talent recruiting application may output various predictive metrics relating to the position, such as source effectiveness of various job posting sources or source types that may be used to post the position, a position difficulty metric indicating a difficulty or ease of the filling the position, a hiring process effectiveness value indicating the effectiveness of one or more hiring processes that are intended to be used or that may be used, and/or a candidate difficulty metric indicating the difficulty or ease of finding a candidate with one or more particular attributes for which the company or other user is looking. The predictive metrics are based on the aggregated data (that may be stored in a database) and the corresponding statistics that are determined based on the aggregated data. Therefore, the vast amount of data relating to past positions (from position approval, posting, receipt of application(s), interview(s), offer(s), through acceptance and hire) provided by the customers may be used to provide predictive metrics for hiring a similar position in the future.

In some embodiments, the one or more predictive metrics may include a source effectiveness value of one or more employment position sources. The source effectiveness value indicates a predicted effectiveness of each of the one or more employment position sources. The employment position sources may include a job board, a job placement agency, a print source, a social media application, a job networking application, an academic job recruiting application, or any other source for posting an employment position. In some embodiments, the one or more predictive metrics may include an effectiveness value of one or more employment position source types (instead of a particular source), wherein the effectiveness value indicates a predicted effectiveness of each of the one or more employment position source types.

The effectiveness values and corresponding predicted effectiveness indicates the sources and/or source types that effectively yield applicants and hires for a particular employment position. The predictive effectiveness values for sources or source types may be calculated for a population of applications submitted by candidates for a particular employment position. Various attributes may be used to define the population, including a standardized employment position, a standardized location, a creation date for the employment position, and/or the industry of the position. For example, the effectiveness values may be used to answer various questions that an employer may have, such as: Which source types yield the most number of applicants for cashier positions in the retail industry in the New York area in October or which sources have the highest percentage of hires in the mortgage industry?

The effectiveness values may be generated using different calculations. For example, the effectiveness values may be indicative of a source type effectiveness and may be calculated as follows: Source Type Effectiveness=Applications from Source Type/Total Applications. As another example, the effectiveness values may represent a source type efficiency for a particular type of source. Effectiveness values based on a source type efficiency may be calculated as follows: Source Type Efficiency=Hires from Source Type/Applications from Source Type. As yet another example, effectiveness values may be based on an effectiveness of a particular source and may be calculated as follows: Source Effectiveness=Applications from Source/Total Applications. As another example, effectiveness values may represent efficiency of a particular source. Effectiveness values based on source efficiency may be calculated as follows: Source Efficiency=Hires from Source/Applications from Source. In some embodiments, the sources and/or source types may be ranked on a normalized scale on both effectiveness and efficiency.

In some embodiments, the process 300 may further include performing the steps illustrated in the process 400 of FIG. 4. Process 400 beings at 402 by receiving input corresponding to an indication of a particular employment position. In some embodiments, input may also be received corresponding to an indication of a location of the employment position, a creation date for the employment position, and/or the industry of the position. Process 400 further includes determining a source effectiveness value for each of the one or more employment position sources for the particular employment position at 404. At 406, the process 400 may rank the one or more employment position sources based on the source effectiveness value of each employment position source for the particular employment position.

In some embodiments, predictive modeling techniques may be used to rank sources and/or source types based on their effectiveness values. For example, a machine learning library, such as an Apache Mahout machine learning library, may be used as a predictive modeling technique. The predictive modeling techniques may use various inputs to rank the sources and/or source types. For example, the various inputs may include a job title (e.g., sales representative, vice president of sales, engineering manager, Java developer, and the like), a job function (e.g., sales, engineering, Java, and the like), and/or a job location (e.g., country, state, and/or city). In some embodiments, the job title and/or the job function may be normalized, as described above. Utilizing an amount of employees hired, an amount of aces hired, and a total number of applications per each instance of a job title, job function, and location in the customer database, a classifier model may be trained with a machine learning library application programming interface (API). As used herein, an ace may refer to a candidate that scores above a predetermined threshold in the job screening process based, for example, on past experience (e.g., number of years, position(s) held, awards received, number and/or type of publications, and the like) and/or needs of the company. The classifier model may then be utilized to output effectiveness rankings. Further details relating to predictive modeling techniques used to rank sources and/or source types will now be described.

A combination of parameters (e.g., job title, job function, location, source or source type, outcome (hire or success), and the like) may be determined, and existing data in a database that relates to the parameter combinations and the sourcing options for which the parameters are associated may be utilized to train a classifier model. Once the classifier model has been trained using the existing data, any incoming combination of parameters or features can be used to classify it as one of the sources. Furthermore, taking probabilities of classification into each source, along with numerous weightings based on quality and yield, source rankings can be efficiently generated off-line for each possible combination of parameters. A resulting predictive data model can thus efficiently process all of the data off-line and can process all incoming queries from users to output results based on the queries.

The classifying process may begin by pre-aggregating all combinations of job title, job function, location, and/or source (or source type), along with the number of employees hired per combination (outcome), in order to train the classifier model. The aggregation may be done by an aggregator using a Map-Reduce job, and the classifier model may be trained with each combination weighted by the hired amount for each combination. The aggregator may also keep track of all possible combinations of parameters for classification after the classifier is trained, and may record the number of hired aces and applicants per combination, in order to have a weighting statistic to aid in generating rankings. In some embodiments, further aggregation may be done to implement a validation measure to test the accuracy of the classifications and rankings. As a result of the pre-aggregation, the amount of data that requires handling is significantly reduced, and the relevant numbers and variables may be pulled from the database as needed.

A data model may then be generated and trained to determine the probability that each combination of parameters being classified belongs to each source or source type. The generation and training of the data model may be accomplished using a shell script that invokes one or more machine learning library terminal commands (e.g., an Apache Mahout machine learning library, or the like). For example, the script may first turn all of the training data generated by the aggregator into sparse vectors (e.g., from a sequence file format) in order to give words from the database that are associated with the parameters (locations, job titles, and/or job functions) term frequency-inverse document frequency (TFIDF) weights based on how often the words appear and how unique the words are to each specific combinations. Accordingly, when classifying new combinations of the parameters, the weights are taken into consideration and factored into the association of the parameter combination with a particular source or source type using a distance measure related to text classification. Each word or variable is separated in the text classification by being prefixed (e.g., "c_" for city, "s_" for state, "j_" for job title, "f_" for job function, and the like) and serialized into an identification (ID) rather than using the entire text. By prefixing and serializing the combination variables into individual IDs, undesired collisions with other variable data may be avoided (such as cities having the same name but not being related in any way). Using the categorical variables and their frequencies, the process may determine the sources or source types that are most effective for particular combinations. A machine learning library command may then be utilized to train a classifier model (e.g., a Naïve Bayes classifier, a support vector machine (SVM) classifier, or the like) in order to examine the variables in relation to one another rather than assuming that each of the variables are independent.

Once the classifier has been trained, all possible combinations of the parameters may be classified and source effectiveness rankings may be determined for all groupings. In some embodiments, a Java program may be used to classify all possible parameter combinations and to determine the source effectiveness rankings. For example, all possible combinations of locations, job titles, and/or job functions may be classified using the Java program. The program uses various input parameters, such as the classifier model itself (e.g., the Bayes model, SVM model, or the like), parameter frequency (e.g., how often each location, job title, and/or job function appears). The program may map back to the necessary parameters (words associated with the parameters) from the serialized IDs used in the intermediate steps described above. Using the classifier model created from the machine learning library API (e.g., the Mahout API, or the like), each combination of parameters is separated into its individual variables and input into the classifier model with their computed TFIDF weights.

The classifier then uses these words and associated weights in order to provide the probability that each combination is to be associated with each source or source type. The probabilities are then utilized to generate rankings of source effectiveness. For example, the probabilities are normalized to be relative to the largest probability, with the smallest going to 0. The probabilities may then be weighted to produce source effectiveness scores. For example, the probabilities may be weighted by the number of employees hired per source or source type in the state or other desired area (e.g., sources which lead to less hires are penalized), the quality of the employees for each source or source type in the state or other desired area (e.g., amount of aces relative to total employee count), and the yield for each source or source type (e.g., hired employees relative to the number of applications). The source effectiveness scores may be converted to percentages, with the most effective source or source type having a 100 percent effectiveness score and the least effective source or source type having a 0 percent effectiveness score. In some embodiments, the source effectiveness scores may be converted into an alphabetical value, with A being the most effective source or source type and F being the least effective source or source type. The source effectiveness percentages or alphabetical values may be output for viewing by a user. Each source or source type is given a ranking that may also be produced as an output for viewing by a user.

In some embodiments, the rankings and effectiveness scores for a particular combination of parameters may be queried by a user. For example, the user may provide input corresponding to the particular combination that is desired (e.g., a combination of job title, job function, and/or location). In some embodiments, the rankings and effectiveness scores may be produced as a fact table that can be queried by a user by inputting a query. In response to the query, results based on the combination input by the user may be output for viewing and/or selection. In some embodiments, a particular number of sources or source types for a queried combination may be provided as an output. For example, the top five sources or source types for the queried combination may be provided as an output of the model.

In some embodiments, source or source type effectiveness may be determined without receiving input specifying a location (e.g., city, state, and the like), job title, and/or a job function, thus allowing for queries from customers or users ranging from a very low level of detail to a high level of details.

In some embodiments, the one or more predictive metrics relating to the plurality of employment positions that are generated using one or more of the statistics may include a position difficulty metric indicating a difficulty of filling an employment position. The position difficulty metric is calculated for a particular employment position or job. In some embodiments, the employment positions may be standardized across each relevant industry (e.g., store associate, Java programmer, director of marketing etc.). For example, job information for open employment positions (e.g., job title, job description, etc.) may be abstracted or normalized so that analysis can be done on a consistent basis for similar positions, as described above. The position difficulty metric may provide a company, recruiter, or other user that is planning to post a particular employment position an indication of how difficult or easy it may be to hire a candidate for that particular position (based on data corresponding to a normalized version of the position). For example, a company or other user of the talent recruiting application may input a particular job title. In response, a normalized version of the job title may be searched and various factors (described below) may be determined and used to generate a position difficulty metric. Accordingly, questions that may be answered using the position difficulty metric include what the industry standard for a particular job is (e.g., how long does it take to hire registered nurses?).

The position difficulty metric may be determined for a position based on a variety of factors, including a time period indicating how long was required to fill the employment position (a time to fill), a time period indicating how long was required to hire a candidate for the employment position (a time to hire), a hiring rate for the employment position, and/or an offer acceptance rate for the employment position. A time to fill may be calculated as follows: Time to Fill=Date Position Was Filled−Date Position Was Approved. A time to hire may be calculated as follows: Time to Hire=Date Candidate Was Hired−Date Position Was Created. A hiring rate may be calculated as follows: Applicant Hire Rate=Applicant Hired/Applications Completed. An offer acceptance rate may be calculated as follows: Offer Acceptance Rate=Offers Accepted/Offers Extended. One or more of these factors, or a combination thereof, may indicate how easy or difficult it is to hire a particular type of position (e.g., a software developer). For example, a lengthy time to fill a position and/or time to hire that position may indicate that the supply of candidates is low and/or that there exists a large amount of competition for candidates for the position. As another example, a large hiring rate may indicate that the pool of candidates is small. As yet another example, a low offer acceptance rate may indicate that competition is high for the position.

In some embodiments, various attributes may be used to augment or refine the position difficulty metric. For example, a standardized location may be used to refine a search for the difficulty of hiring for a position. As an example of a standardized location, all job locations may be mapped to a common standard, such as a Metropolitan Statistical Area (MSA). As a result, a company or other user may limit a query to a particular position in a standard location according to the MSA. Other attributes that may be used to augment or refine the position difficulty metric include the creation date of the employment position or the particular industry that the position is in. Accordingly, a company can determine, for example, how long it takes to hire cashiers (position) in the retail industry (industry) in the New York area (standardized location) in October (creation date of job).

In some embodiments, the one or more predictive metrics relating to the plurality of employment positions that are generated using one or more of the statistics may include a hiring process effectiveness value of one or more hiring processes. The hiring process effectiveness value indicates a predicted effectiveness of each of the one or more hiring processes that may be used by an employer or other hiring party. The hiring process effectiveness value may be calculated for a population of applications. Various attributes may be used to define the population of applications, including a standardized job (using, for example, normalized job titles), a standardized location (using, for example, a MSA), the creation date of the job, and the industry of the position. For example, a hiring process for a particular job in a particular industry in a standard location at a particular time of year may be evaluated to determine its predicted effectiveness in hiring a quality candidate.

In some embodiments, the hiring process effectiveness value may be based on various metrics for position postings and may be calculated using different functions for the different metrics. For example, the hiring process effectiveness value may be based on a time to approve a position or positions using the hiring process, and may be calculated as follows: Time to Approve=First Fully Approved Date−Created Date (Calculated for single and multi-position requisitions). In another example, the hiring process effectiveness value may be based on a time it takes to post a position or positions using the hiring process, and may be calculated as follows: Time to Post=Posted Date−First Fully Approved Date. In another example, the hiring process effectiveness value may be based on a position fill ratio using the hiring process, which may be calculated as follows: Fill Ratio=Number of Job Postings Filled/Number of Job Postings Approved. In yet another example, the hiring process effectiveness value may be based on an Ace posting effectiveness using the hiring process, and may be calculated as follows: Ace Posting Effectiveness=Number of positions posted with Ace On/Number of Positions Posted. Any combination of the above metrics may be used to calculate the effectiveness of a particular hiring process.

In some embodiments, the hiring process effectiveness value may also be based on various metrics for received applications and may be calculated using different functions for the different metrics in addition to, or as an alternative to, the metrics relating to position postings. For example, the hiring process effectiveness value may be based on a time to complete an application using the hiring process, and may be calculated as follows: Time to Complete=Completed Date−Application Created Date. In another example, the hiring process effectiveness value may be based on a time it takes to review a completed application using the hiring process, and may be calculated as follows: Time to Review=Latest Review Date−Completed Date. In another example, the hiring process effectiveness value may be based on a time it takes to make an offer using the hiring process, and may be calculated as follows: Time to Offer=Latest Offer Date−Completed Date (of Application). In another example, the hiring process effectiveness value may be based on a time it takes to receive a decision on an offer using the hiring process, and may be calculated as follows: Time to Offer Decision=Offer Decision Date−Latest Offer Date. In another example, the hiring process effectiveness value may be based on a time it takes to hire a candidate from the application completed date using the hiring process, and may be calculated as follows: Time to Hire=Hired Date−Completed Date (of Application). In yet another example, the hiring process effectiveness value may be based on a time it takes to conduct one or more interviews using the hiring process, such as a first, second, third, etc. interview. The time to interview may be calculated as follows: Time to 1st Interview=Latest 1st Interviewed Date−Completed Date (of Application), Time to 2nd Interview=Latest 2nd Interviewed Date−Complete Date (of Application), Time to 3rd Interview=Latest 3rd Interviewed Date−Complete Date (of Application), and the like. In another example, the hiring process effectiveness value may be based on a number of internal applicants that apply for a position using the hiring process, and may be calculated as follows: Internal Site Draw=Number of Internal Applications/Number of Total Applications. In another example, the hiring process effectiveness value may be based on a number of referral applicants that apply for a position using the hiring process, and may be calculated as follows: Referral Draw=Number of Referral Applications/Number of Total Applications. In another example, the hiring process effectiveness value may be based on an Ace hiring effectiveness using the hiring process, and may be calculated as follows: Ace Hiring Effectiveness=Number of Ace Candidates Hired/Number of Total Hires. In another example, the hiring process effectiveness value may be based on an a ratio of Aces hired versus Aces that applied using the hiring process, which may be calculated as follows: Ace Applications Effectiveness=Number of Ace Hires/Number of Ace Applications. In another example, the hiring process effectiveness value may be based on matched hire effectiveness using the hiring process, and may be calculated as follows: Match Hire Effectiveness=Number of Matched Candidates Hired/Number of Hires. A matched candidate includes a candidate from a general pool of candidates that is paired to a particular job based on an analysis of the candidate's resume. The matching may be performed manually (e.g., a recruiter, a hiring manager, and the like) or may be performed by an automated process. In another example, the hiring process effectiveness value may be based on a referral hiring effectiveness using the hiring process, and may be calculated as follows: Referral Hire Effectiveness=Number of Referred Candidates Hired/Number of Hires. In another example, the hiring process effectiveness value may be based on an effectiveness of hiring internally within a company using the hiring process, and may be calculated as follows: Internal Hire Effectiveness=Number of Internal Candidates Hired/Number of Hires. In yet another example, the hiring process effectiveness value may be based on an effectiveness of hiring externally outside of a company using the hiring process, and may be calculated as follows: External Hire Effectiveness=Number of External Candidates/Number of Hires.

One or more of these metrics may be used to indicate how effective a particular hiring process may be to a company, recruiter, or other user. In some embodiments, a company or other user may narrow or broaden the number of the above metrics that are used in the hiring process effectiveness determination based on the specific needs of the company. Furthermore, as described above, various attributes may be used to augment or refine the hiring process effectiveness value, includes a standardized job (using, for example, normalized job titles), a standardized location (using, for example, a MSA), the creation date of the job, and the industry of the position. Accordingly, a user may provide input regarding the metrics that are important to the hiring company as well as the various attributes that are applicable to a position, and a hiring process for a particular job in a particular industry in a standard location at a particular time of year may be evaluated using the specified metrics to determine the predicted effectiveness of the hiring process in hiring a candidate. In some embodiments, a user may not be required to input any specific metric or attribute to be used in the determination of the hiring process effectiveness value. For example, the user may input or select a hiring process, and the effectiveness of the particular hiring process may be output based on the various metrics that apply to the hiring process.

In some embodiments, the one or more predictive metrics relating to the plurality of employment positions that are generated using one or more of the statistics may include a candidate difficulty metric. The candidate difficulty metric indicates a difficulty or ease of finding an employment position candidate that has one or more particular attributes or a specific candidate set. The attributes and/or candidate set may be drawn from a population of candidates. The population of candidates from which candidates can be drawn can be defined based on various factors, such as a standardized job (using, for example, normalized job titles) and the industry of the position. Accordingly, a company, recruiter, or other user can determine the demographic benchmark for a particular position, a particular industry, or a particular position within a particular industry. For example, a candidate difficulty metric may be determined for the "Retail" industry and/or for an "Actuaries" position.

The desired attributes of the candidate (the candidate set) may be defined or further refined using a set of candidate attributes, such as gender, age, and the like. The candidate difficulty metric may then be used to determine the probability of finding the particular candidate set (a candidate with specific attributes) within the population. As one example, a candidate difficulty metric may indicate to a company or other user what the probability is of finding female candidates over the age of 40 in the "Retail" industry.

Other attributes may be added to further refine the population of candidates, such as a standardized location (using, for example, a MSA) and/or the creation date of the job. A candidate difficulty metric may then be calculated using the added attributes to provide the relative probabilities of finding candidates with the added attributes. For example, given the originally defined candidate set (females that are over 40 in "Retail" industry), a user may be provided with the locations with the highest probability of finding the candidates with these attributes (female, over 40, Retail) at a particular time of year.

Figure 5:
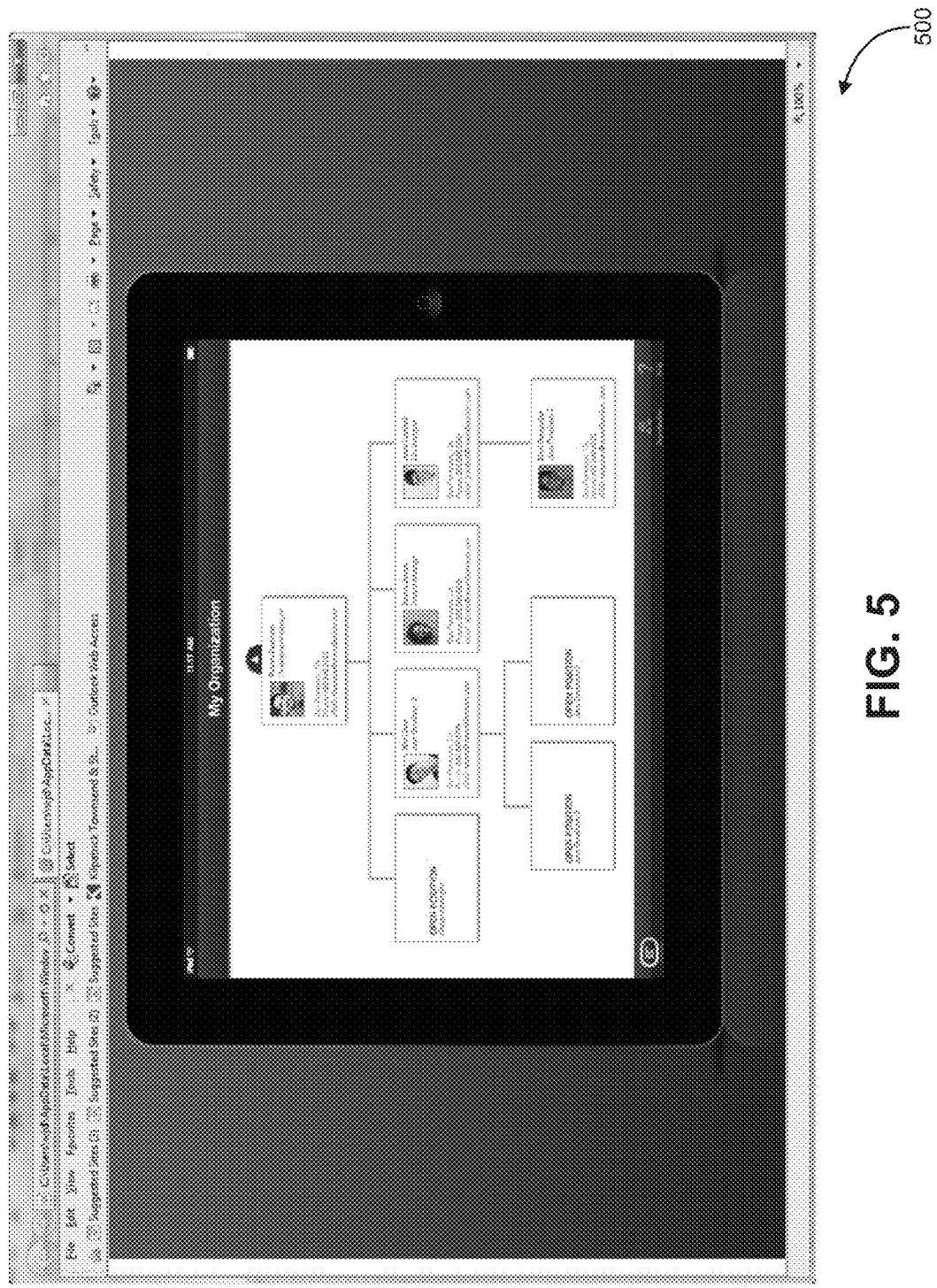
FIGS. 5-20 illustrate exemplary user interfaces for a talent recruiting application according to one embodiment of the present application.

The above processes described in FIGS. 3-4 may be implemented and the various predictive metrics may be output using one or more graphical interfaces. FIGS. 5-20 illustrate exemplary graphical user interfaces for a talent recruiting application according to various embodiments of the present application. FIG. 5 illustrates an exemplary graphical interface 500 that allows a user within an organization (e.g., a department manager, an HR manager, etc.) to look at filled positions and open positions within the organization. The user may select or click on one of the open positions in order to advance to the graphical interface depicted in FIG. 6 and determine whether to post a job posting for the open position. For example, the user may select the open position for "Java Developer II," which will advance the graphical interface to the screen 600 displayed in FIG. 6. Various tabs 610-625 may be selected by a user to display different options relating to the open position.

Figure 6:

Referring to FIG. 6, the Competitive Metrics tab 610 is selected, which provides the screen 600 displaying the various position details of the Java Developer II position. A job description is provided in section 605 describing what the position entails. For example, section 605 includes the position level, the organization within the company, the region or location where the position is located, the name of the manager, the cost center, the head count of open positions, and whether or not the position has been approved. The position metrics 630 section describes the requirements of the position, including education, experience, salary range, specific location, and a graphical chart providing a comparison of the salary range for the location compared to the position salary range for the location.

Market metrics 635 are also displayed, providing various predictive metrics that are derived from data received from a plurality of customers, such as using the methods 300 and 400 described above with respect to FIGS. 3-4. For example, any of the predictive metrics described above with respect to FIGS. 3-4 may be displayed in the market metrics 635 section. As illustrated in the screen 600, a talent availability ratio and an estimated time to hire are provided along with charts depicting a graphical representation of the metrics. For example, the talent availability ratio metric provides a comparison of open positions to possible candidates for those positions. A ratio may be provided indicating that there is a 4:1 ratio of open positions to candidates. The estimated time to hire metric provides a comparison of the time to hire in the market versus the time to hire at the company, as well as a chart showing the historical trend across a period of time. As depicted on the screen 600, the time to hire in the particular market is 130 days.

A talent index 640 is also displayed in the screen 600. For example, the talent index 640 provides a single measure or value that gives the marketplace an indication of relative difficulty for particular positions based on the various predictive metrics calculated using the customer data. The talent index is a representation of current market conditions based on quantitative and statistical analysis of previous postings, interviews, hirings, and the like, which can be derived from the customer data. The talent index can thus give a relative measure of the market between geographic areas. The user may select the "What if?" Modeling tab 615 to adjust the position requirements, which may result in an updated talent index score.

Figure 7:
Figure 8:
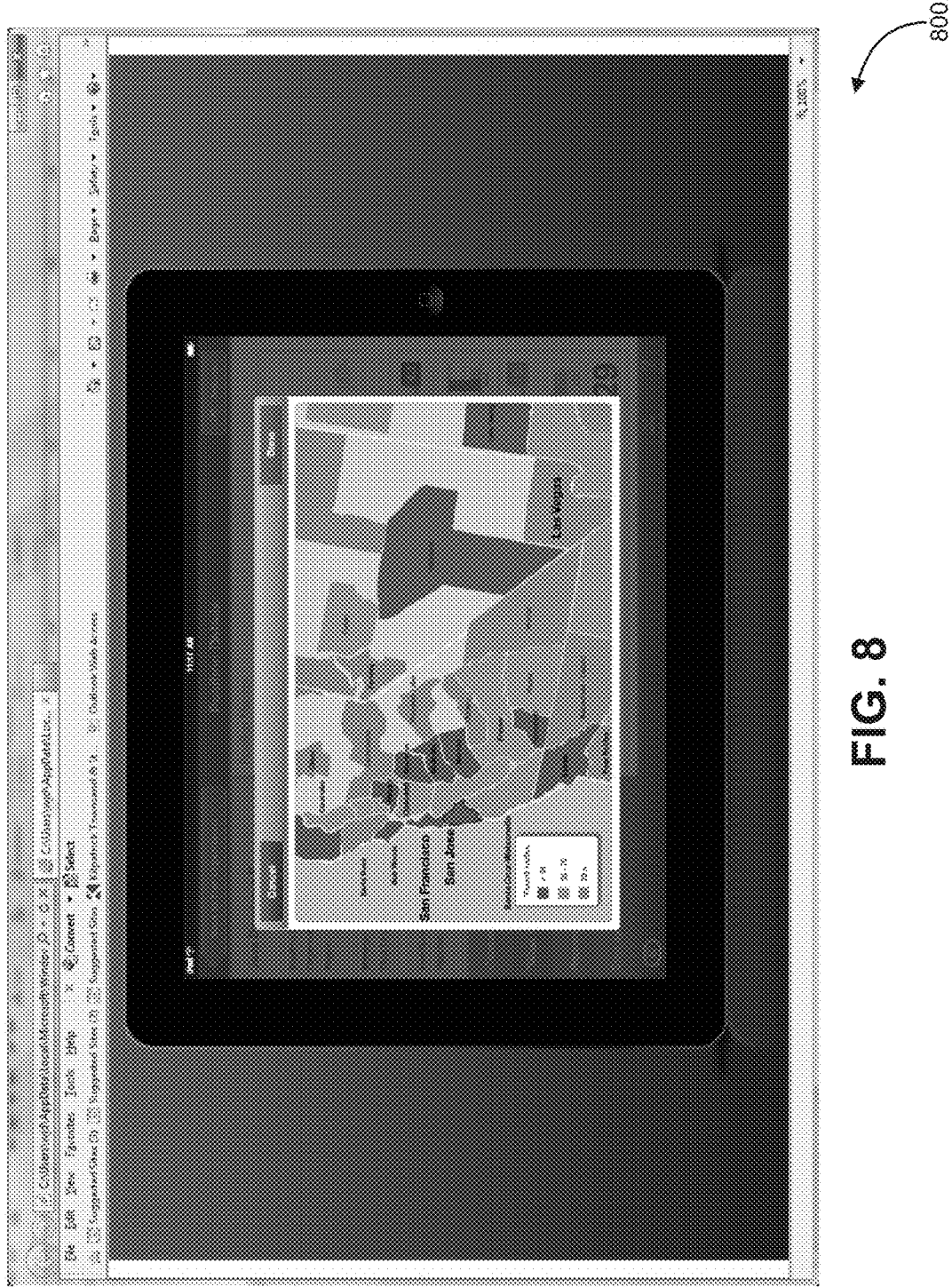

In response to a selection of the "What if?" Modeling tab 615, graphical interface 700 may be displayed, as illustrated in FIG. 7. The position metrics 630 section now enables the user to adjust the position requirements, such as the educational requirements, experience requirements, salary range, and/or the location. For example, the user may select a map icon, which results in the display of the graphical interface 800 illustrated in FIG. 8. The graphical interface 800 shows a map of the Northwestern United States with color coordinated talent index indications. The city of San Jose is outlined in bold because it is currently selected by the user. The color coordinated talent index indicates what the talent index is for the various locations according to the currently selected position metrics 630. For example, the Bakersfield-Deland area has a talent index of over 70 (indicated in green) according to the position metrics of a Bachelor's degree, 3-5 years of experience, and a salary range of $75,000-$95,000. The user may click or otherwise select a new location within the map in order to make a location selection in the position metrics 630.

Figure 9:

As the user adjusts the position metrics, the results 705 may be dynamically updated in real time. The results 705 section provides a comparison of the talent availability ratio, the estimated time to hire, and the talent index prior to the change in the position metrics versus after the change. For example, FIG. 9 illustrates a graphical interface 900 showing a change in the talent availability ratio, the estimated time to hire, and the talent index after the user has updated the location from San Jose, Calif. to Seattle, Wash. As illustrated, the talent availability ratio increased from 4:1 in San Jose to 1:3 in Seattle. The increase in the talent availability ratio indicates that more candidates are available in Seattle than in San Jose. Furthermore, the estimated time to hire increased from 130 days in San Jose to 58 days in Seattle. As a result, the talent index increased from 29 to 72, indicating that the market conditions in Seattle are better for hiring talent for the Java Developer II position as compared to the market in San Jose.

Figure 10:
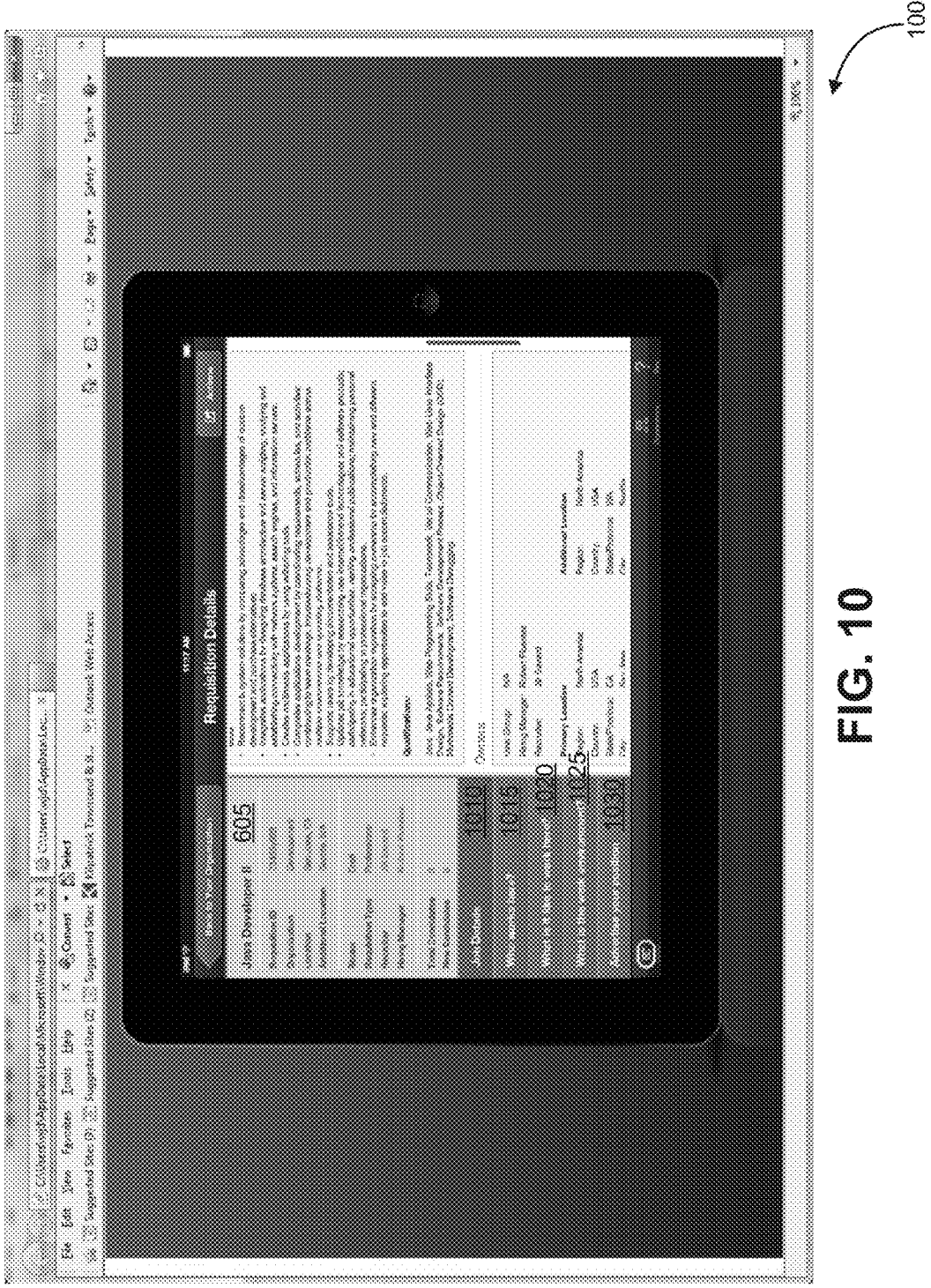

The user may select the Requisition tab 620 in order to advance to the graphical interface 1000 illustrated in FIG. 10. The user may now build the requisition posting that will be provided to candidates using one or more employment sources. As used herein, the term "requisition" refers to a position that may be posted by a company, recruiter, or other user as a job posting. A new set of tabs 1010-1030 is depicted in the graphical interface 1000, which allow the user to specify various details for the requisition. For example, the Job Details tab 1010 enables the user to enter requisition details for the Java Developer II position. These details may include a detailed job description, qualifications, job responsibilities, owners of the position, and the like.

Figure 11:
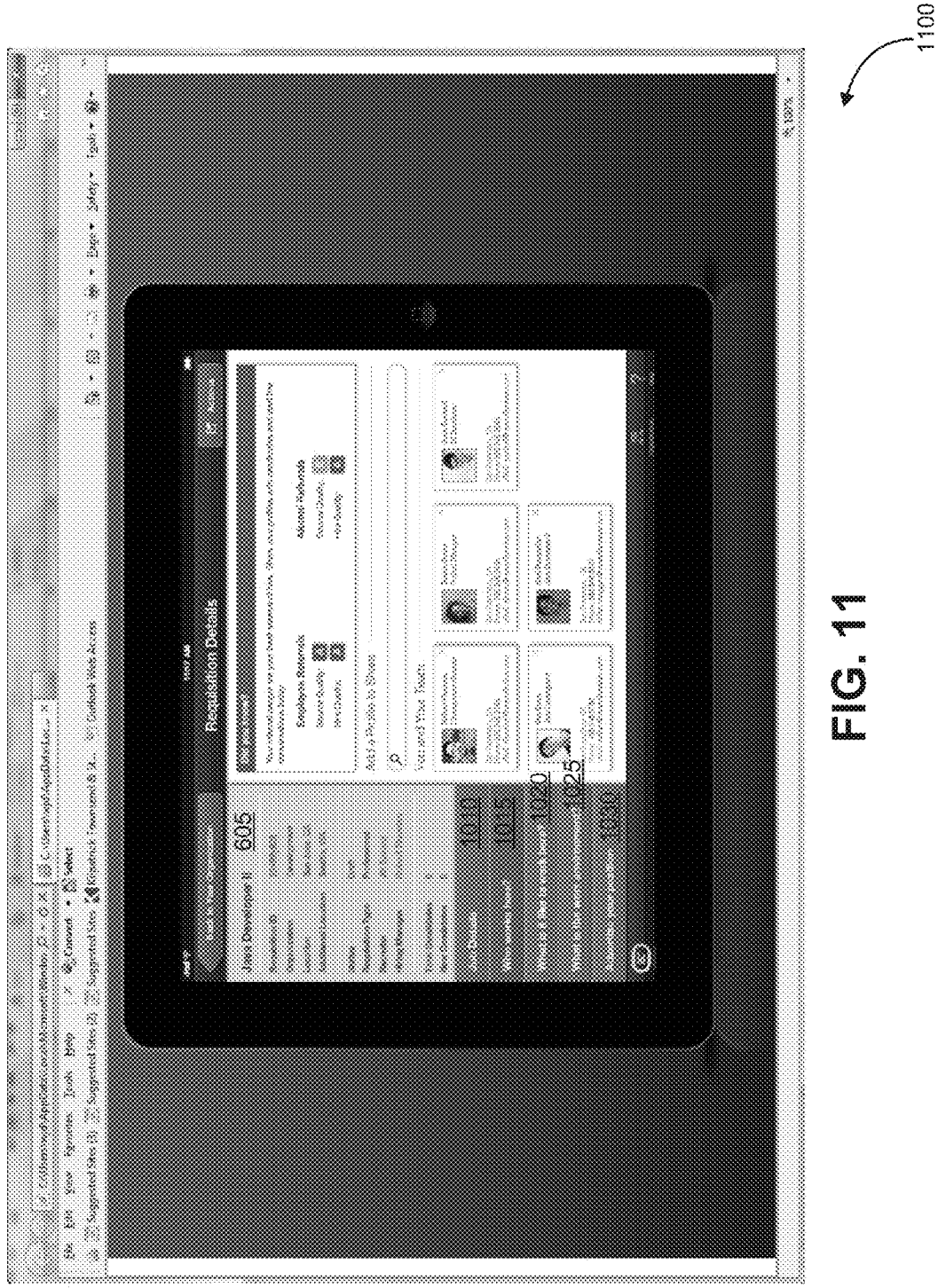

As illustrated in FIG. 11, the user may select the Who Works Here? Tab 1015 in order to provide in graphical interface 1100 details regarding people with whom a potential candidate for the position would work. For example, the team of people that work in the same department may be listed along with a profile listing their position, location, contact information, and the like. Furthermore, a "Did you Know?" section may be displayed that provides useful information regarding the quality of employee referrals as a source for candidate hires. For example, the "Did you Know?" section may indicate that current and former employee referrals have a high source quality (indicating that many candidates apply based on a current employee referral) and a high hire quality (indicating the retention quality of hired candidates). A numerical or alphabetical indication may be used to show the quality of the source, and may include a percentage or an A-F rating (with A being the highest and F being the lowest).

Figure 12:

As illustrated in FIG. 12, the user may select the What is it like to work here? Tab 1020 in order to provide information regarding the culture of the company in graphical interface 1200. For example, a summary of the culture may be provided in the Our Company Culture section. Pictures and/or a description may be entered in the What We Do For Fun section to provide a snapshot of different activities that the current employees of the company engage in. For example, the employees may periodically take kayaking trips, go bowling, and/or have parties as a team. The user may provide details and pictures describing the different activities so that a potential candidate can have an inside perspective on the company's culture.

Figure 13:

Other cultural details may be provided in the Cultural Elements section, as illustrated in FIG. 13. For example, slide bars or other adjustable graphical elements may be provided to indicate the scale of different cultural factors. For example, cultural factors may include dresscode, market position, company size, how we work, etc. The example illustrated in FIG. 13 indicates that the company has a casual dresscode, a medium to large market position, a medium size, and a mixed collaborative environment. The Cultural Elements section thus gives a potential candidate an idea of how the company culture may be from an everyday workday perspective.

Figure 14:

FIG. 14 illustrates graphical interface 1400 that shows work environment details in response to selection of the What is the work environment? Tab 1025. For example, in The Office section, pictures and/or a description of the office may be displayed to provide a potential candidate with an idea of the physical office environment. A potential candidate may be intrigued by the fact that the company has a game room within the office building, which may entice them to apply to the position. Furthermore, in The Tools section, different devices that may be provided to the potential candidate if hired are displayed. A description may also be provided to describe the purpose and/or functions of the tools. A section describing The Neighborhood may also be provided with information on the proximity surrounding the office. For example, information may be provided for the neighborhood itself, such as whether the company is in walking distance to restaurants, public transportation, workout facilities, and the like.

Figure 15:
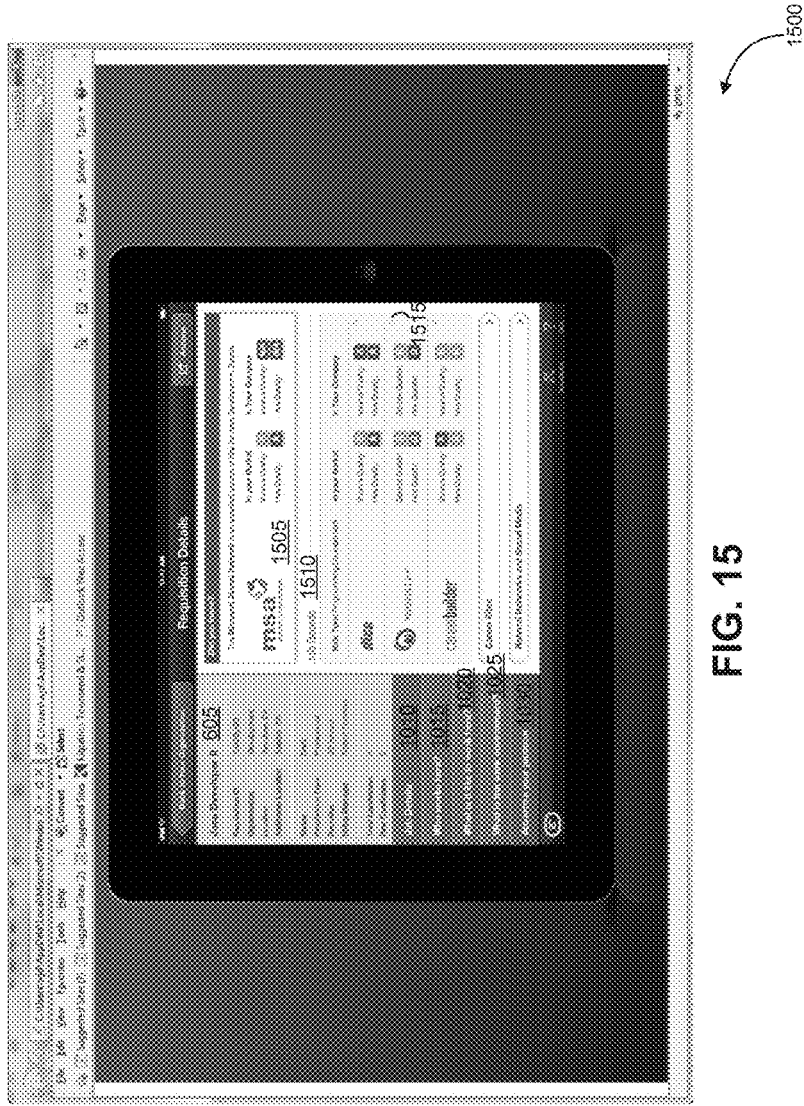
Figure 16:
Figure 17:
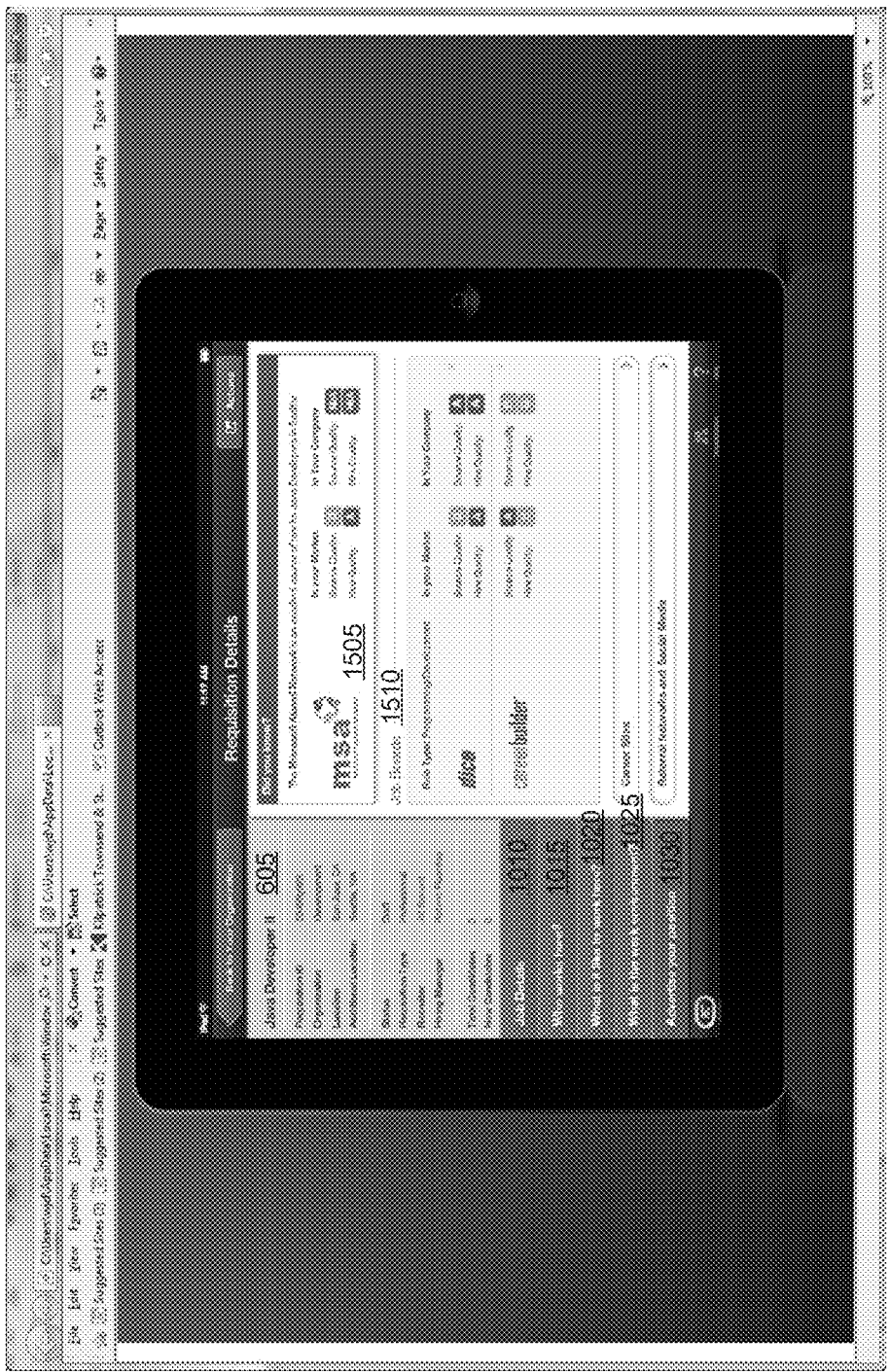

As illustrated in FIG. 15, a user may select the Advertise your position tab 1030 to review potential sources that may be used to post the position. Different source effectiveness values or scores may be provided for each displayed source. For example, the methods 300 and 400 described above with respect to FIGS. 3-4 may be used to generate and/or rank source effectiveness values for the sources or source types. The graphical interface 1500 may include a Job Boards section 1510 that lists a group of job board sources that the user can potentially use to post the Java Developer II position. Each job board source may have a source effectiveness value for source quality and hire quality in the company's market and within the company. The job boards may be suggested based on the source effectiveness values. The job boards may also be ranked in the graphical interface 1500 based on the source effectiveness values. The source effectiveness values may be a numerical or alphabetical value used to show the quality of the source, and may include a percentage or an A-F rating (with A being the highest and F being the lowest). For example, the job board Dice may have a source effectiveness value of B for source quality within the market and an A for hire quality within the market. However, within the company, the source quality may have a value of A. As a comparison, the job board Monster may have lower source and hire qualities both in the market and within the company, as compared to Dice and CareerBuilder. The user may click or otherwise select the Monster tab in order to see further details on the job board, as illustrated in FIG. 16. For example, various graphical charts may show different source effectiveness values over time, such as average number of applications per hire for source quality and percentages of hires that were retained for at least one year for hire quality. If the user does not wish to post to Monster based on the poor source effectiveness values, the user may select the x-button 1515 shown in FIG. 15 in order to remove Monster from the Job Boards section, as illustrated in the graphical interface 1700 of FIG. 17.

Figure 18:
Figure 19:
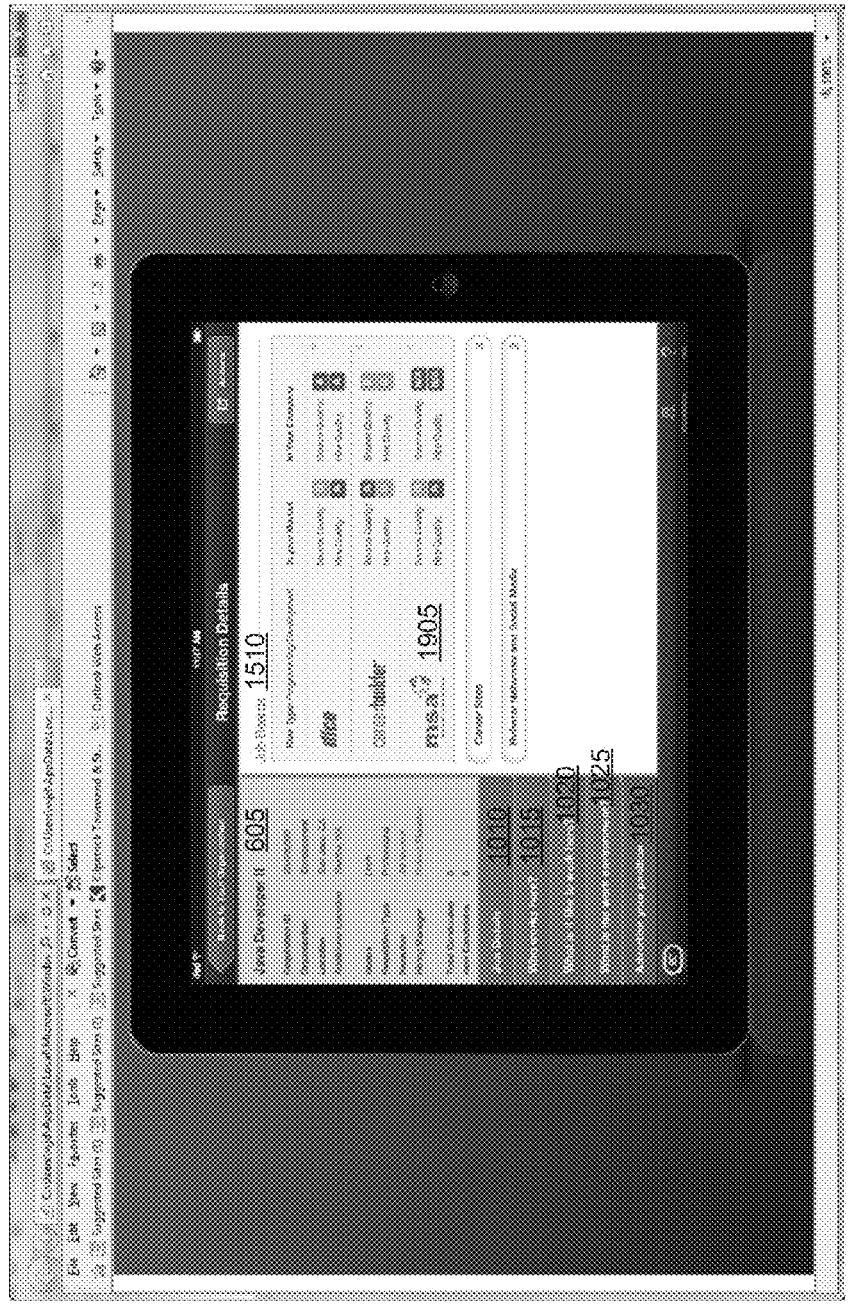

Returning to FIG. 15, a Did you Know? Section 1505 may be displayed in the graphical interface 1500 providing the user with an indication of one or more less well-known sources that the particular user may not be aware of. For example, the user may be a project manager that lives in San Jose, but has decided to hire for the Java Developer II position in Seattle based on the metrics comparison illustrated in FIG. 9 indicating that better talent is available in Seattle. Did you Know? Section 1505 may suggest the Microsoft Alumni Network (MSA) as a good source for the user to source from based on all of the data that the talent recruiting application has received and aggregated from different companies or organizations recruiting in the Washington area. The user may click or otherwise select the Microsoft Alumni Network (MSA) tab in order to view more details on the job source, as illustrated in FIG. 18. A graph for source quality indicates a number of applications per hire using the MSA source. A graph for hire quality indicates that approximately 80% of all hires were retained for at least one year. If the user decides to post to the MSA source, the user may drag-and-drop or otherwise indicate the desire to use the MSA source as a posting source for the Java Developer II position, as illustrated in the MSA tab 1905 of FIG. 19. The user may add further sources by selecting the Career Sites tab and/or the Referral Networks and Social Media tab. The career site, referral network, and social media sources may be added and/or deleted in a similar manner as the job board sources described above.

Figure 20:
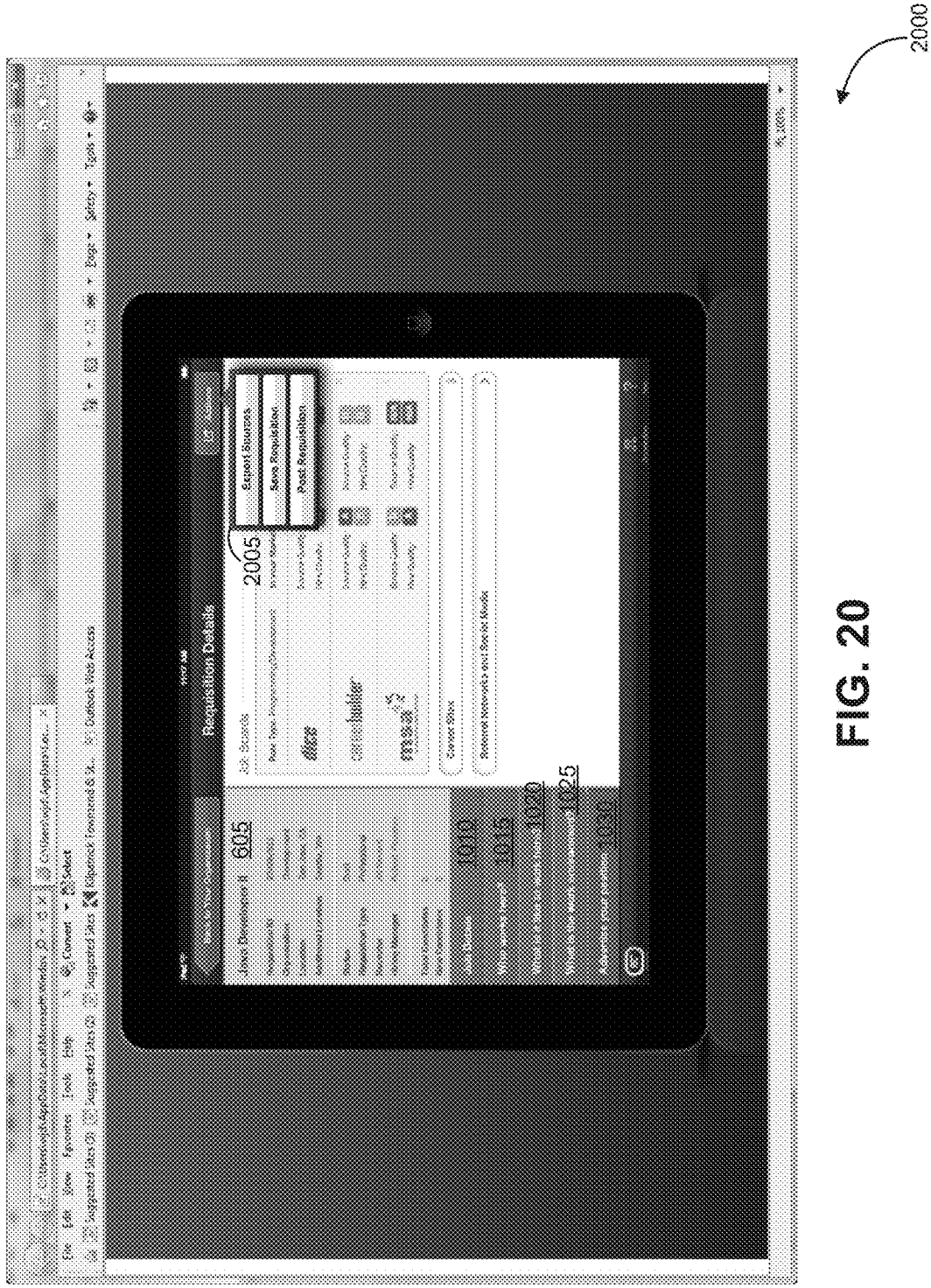

After the user has entered in all of the requisition, company, cultural, environmental, and source details, the user may select the actions button, which results in the display of an actions list 2005 in the graphical interface 2000 illustrated in FIG. 20. The actions list 2005 allows the user to choose among various choices, such as exporting the selected sources, saving the requisition for posting at a later time, or posting the requisition to the selected sources.

Accordingly, the talent recruiting application may be offered as a hosted solution and can generate, maintain, and use very large amounts of data received from various companies or organizations that relates to past and present open positions as well as past and present candidates. The data may be analyzed to determine detailed statistics of the positions based on information included in the data, and useful metrics may be provided to users of the application based on the statistics. As a result, the application aggregates and maintains the data, and also tracks a posting for an open position and recruiting engagements from beginning to end (from a posting of an open position, to an application by a candidate, to an interview of the candidate, to an offer of employment in the position to that candidate, to an acceptance of the offer by the candidate, and on-boarding of the candidate as a new employee of the company). Such extensive, end-to-end data, especially when viewed across multiple different customers or businesses, is used to provide visibility into dynamics of the talent market so that companies and recruiters can effectively hire in the prime markets at any given point in time.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
receiving, by a computing device, data relating to a plurality of employment positions, wherein the data relating to the plurality of employment positions is received from a plurality of employment position sources, and wherein the data relating to each employment position of the plurality of employment positions includes:
a job title for that employment position;
a job function for that employment position;
a location for that employment position;
the employment position source from the plurality of employment position sources through which data relating to that employment position was received; and
an indication of whether that employment position was filled or unfilled;
pre-aggregating, by the computing device, the data relating to the plurality of employment positions received from the plurality of employment position sources to determine a number of filled employment positions associated with every combination of job title, job function, location, and employment position source available in the data relating to the plurality of employment positions;
converting the pre-aggregated data into a set of sparse vectors from one or more sequence file formats;
applying a machine learning technique to train a classifier data model using the set of sparse vectors, wherein the classifier data model is configured to determine an employment source through which a job seeker will mostly be hired for an employment position with a given combination of a job title, a job function, and a location, and wherein the employment source is determined based on an average number of applications per hire through the employment source for that given combination;
receiving a user input from the job seeker corresponding to a particular combination of a job title, job function, and a location; and
applying the classifier data model to the particular combination to determine the employment source through which the job seeker will most likely be hired for an employment position with the particular combination.

2. The method of claim 1, wherein the method further comprises:
determining, based on the pre-aggregated data, one or more statistics based on the data relating to the plurality of employment positions; and
generating one or more predictive metrics relating to the plurality of employment positions using the one or more statistics.

3. The method of claim 2, wherein the one or more predictive metrics includes a source effectiveness value of one or more employment position sources, wherein the source effectiveness value indicates a predicted effectiveness of each of the one or more employment position sources.

4. The method of claim 3, further comprising:
receiving, by the computing device, input corresponding to an indication of a particular employment position;
determining a source effectiveness value for each of the one or more employment position sources for the particular employment position; and
ranking the one or more employment position sources based on the source effectiveness value of each employment position source for the particular employment position.

5. The method of claim 2, wherein the one or more predictive metrics includes an effectiveness value of one or more employment position source types, wherein the effectiveness value indicates a predicted effectiveness of each of the one or more employment position source types.

6. The method of claim 2, wherein the one or more predictive metrics includes a position difficulty metric indicating a difficulty of filling an employment position.

7. The method of claim 6, wherein the position difficulty metric indicating the difficulty of filling the employment position is determined based on one or more of a time period indicating how long was required to fill the employment position, a time period indicating how long was required to hire a candidate for the employment position, a hiring rate for the employment position, or an offer acceptance rate for the employment position.

8. The method of claim 2, wherein the one or more predictive metrics includes a hiring process effectiveness value of one or more hiring processes, wherein the hiring effectiveness value indicates a predicted effectiveness of each of the one or more hiring processes.

9. The method of claim 2, wherein the one or more predictive metrics includes a candidate difficulty metric indicating a difficulty of finding an employment position candidate with one or more particular attributes.

10. A talent recruiting system, comprising:
a memory storing a plurality of instructions; and
one or more processors configured to access the memory, wherein the one or more processors are further configured to execute the plurality of instructions to:
receive data relating to a plurality of employment positions, wherein the data relating to the plurality of employment positions is received from a plurality of employment position sources, and wherein the data relating to each employment position of the plurality of employment positions includes:
a job title for that employment position;
a job function for that employment position;
a location for that employment position;
the employment position source from the plurality of employment position sources through which data relating to that employment position was received; and
an indication of whether that employment position was filled or unfilled;
pre-aggregate the data relating to the plurality of employment positions received from the plurality of employment position sources to determine a number of filled employment positions associated with every combination of job title, job function, location, and employment position source available in the data relating to the plurality of employment positions;
convert the pre-aggregated data into a set of sparse vectors from one or more sequence file formats;
apply a machine learning technique to train a classifier data model using the set of sparse vectors, wherein the classifier data model is configured to determine an employment source through which a job seeker will mostly be hired for an employment position with a given combination of a job title, a job function, and a location, and wherein the employment source is determined based on an average number of applications per hire through the employment source for that given combination;
receive a user input from the job seeker corresponding to a particular combination of a job title, job function, and a location; and apply the classifier data model to the particular combination to determine the employment source through which the job seeker will most likely be hired for an employment position with the particular combination.

11. The system of claim 10, wherein the one or more processors are further configured to execute the plurality of instructions to:
  determine, based on the pre-aggregated data, one or more statistics based on the data relating to the plurality of employment positions; and
  generate one or more predictive metrics relating to the plurality of employment positions using the one or more statistics.

12. The system of claim 11, wherein the one or more predictive metrics includes a source effectiveness value of one or more employment position sources, wherein the source effectiveness value indicates a predicted effectiveness of each of the one or more employment position sources.

13. The system of claim 11, wherein the one or more predictive metrics includes a position difficulty metric indicating a difficulty of filling an employment position.

14. The system of claim 11, wherein the one or more predictive metrics includes a hiring process effectiveness value of one or more hiring processes, wherein the hiring effectiveness value indicates a predicted effectiveness of each of the one or more hiring processes.

15. The system of claim 11, wherein the one or more predictive metrics includes a candidate difficulty metric indicating a difficulty of finding an employment position candidate with one or more particular attributes.

16. A non-transitory computer-readable memory storing a plurality of instructions executable by one or more processors, the plurality of instructions comprising:
  instructions that cause the one or more processors to receive data relating to a plurality of employment positions, wherein the data relating to the plurality of employment positions is received from a plurality of employment position sources, and wherein the data relating to each employment position of the plurality of employment positions includes:
  a job title for that employment position;
  a job function for that employment position;
  a location for that employment position;
  the employment position source from the plurality of employment position sources through which data relating to that employment position was received; and
  an indication of whether that employment position was filled or unfilled;
  instructions that cause the one or more processors to pre-aggregate the data relating to the plurality of employment positions received from the plurality of employment position sources to determine a number of filled employment positions associated with every combination of job title, job function, location, and employment position source available in the data relating to the plurality of employment positions;
  instructions that cause the one or more processors to convert the pre-aggregated data into a set of sparse vectors from one or more sequence file formats;
  instructions that cause the one or more processors to apply a machine learning technique to train a classifier data model using the set of sparse vectors, wherein the classifier data model is configured to determine an employment source through which a job seeker will mostly be hired for an employment position with a given combination of a job title, a job function, and a location, and wherein the employment source is determined based on an average number of applications per hire through the employment source for that given combination;
  instructions that cause the one or more processors to receive a user input from the job seeker corresponding to a particular combination of a job title, job function, and a location; and
  instructions that cause the one or more processors to apply the classifier data model to the particular combination to determine the employment source through which the job seeker will most likely be hired for an employment position with the particular combination.

17. The non-transitory computer-readable memory of claim 16, wherein the plurality of instructions further comprise:
  instructions that cause the one or more processors to determine, based on the pre-aggregated data, one or more statistics based on the data relating to the plurality of employment positions; and
  instructions that cause the one or more processors to generate one or more predictive metrics relating to the plurality of employment positions using the one or more statistics.

18. The non-transitory computer-readable memory of claim 17, wherein the one or more predictive metrics includes a position difficulty metric indicating a difficulty of filling an employment position.

19. The non-transitory computer-readable memory of claim 17, wherein the one or more predictive metrics includes a hiring process effectiveness value of one or more hiring processes, wherein the hiring effectiveness value indicates a predicted effectiveness of each of the one or more hiring processes.

20. The non-transitory computer-readable memory of claim 17, wherein the one or more predictive metrics includes a candidate difficulty metric indicating a difficulty of finding an employment position candidate with one or more particular attributes.

* * * * *

UNITED STATES PATENT AND TRADEMARK OFFICE
CERTIFICATE OF CORRECTION

PATENT NO. : 9,818,086 B2
APPLICATION NO. : 14/023310
DATED : November 14, 2017
INVENTOR(S) : Sharad Thankappan et al.

Page 1 of 1

It is certified that error appears in the above-identified patent and that said Letters Patent is hereby corrected as shown below:

In the Specification

Column 17, Line 18 "based on an a ratio" should read --based on a ratio--.

Signed and Sealed this
Twenty-second Day of January, 2019

Andrei Iancu
*Director of the United States Patent and Trademark Office*